US008953052B2

(12) United States Patent
Kusaka

(10) Patent No.: US 8,953,052 B2
(45) Date of Patent: Feb. 10, 2015

(54) IMAGING DEVICE

(75) Inventor: Hiroya Kusaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 602 days.

(21) Appl. No.: 13/314,198

(22) Filed: Dec. 8, 2011

(65) Prior Publication Data

US 2012/0147148 A1    Jun. 14, 2012

(30) Foreign Application Priority Data

Dec. 9, 2010  (JP) .................................. 2010-274291
Dec. 1, 2011  (JP) .................................. 2011-263795

(51) Int. Cl.
H04N 13/02    (2006.01)
H04N 5/232    (2006.01)

(52) U.S. Cl.
CPC ....... H04N 5/23258 (2013.01); H04N 5/23287 (2013.01); H04N 13/0217 (2013.01); H04N 13/0296 (2013.01)
USPC ........................................ 348/208.2; 348/49

(58) Field of Classification Search
USPC ................................ 348/49, 208.2
See application file for complete search history.

(56) References Cited

U.S. PATENT DOCUMENTS

| 7,440,007 | B2 | 10/2008 | Hoshi |
| 8,155,432 | B2 | 4/2012 | Ueno |
| 2005/0256391 | A1* | 11/2005 | Satoh et al. ................... 600/407 |
| 2006/0133786 | A1 | 6/2006 | Teramoto |
| 2006/0227211 | A1* | 10/2006 | Kotake et al. ................. 348/141 |
| 2008/0131107 | A1 | 6/2008 | Ueno |

FOREIGN PATENT DOCUMENTS

| JP | S62-153816 A | 7/1987 |
| JP | H4-331586 A | 11/1992 |
| JP | H5-7374 A | 1/1993 |
| JP | H5-66450 A | 3/1993 |
| JP | H7-128619 A | 5/1995 |
| JP | H08-317424 A | 11/1996 |
| JP | H9-261524 A | 10/1997 |
| JP | H10-311993 A | 11/1998 |
| JP | 2001-109089 A | 4/2001 |
| JP | 2002-090921 A | 3/2002 |
| JP | 2005-49598 A | 2/2005 |
| JP | 2005-130312 A | 5/2005 |

(Continued)

OTHER PUBLICATIONS

Office Action from the corresponding Japanese Patent Application No. 2011-263795 issued on Nov. 4, 2014.

Primary Examiner — Sath V Perungavoor
Assistant Examiner — Jeffery Williams
(74) Attorney, Agent, or Firm — Shinjyu Global IP

(57) ABSTRACT

An imaging device is provided that includes a lens mount, an imaging element, a system controller, a sensor and a rotation corrector. The rotation corrector is configured to reduce change in the positional relationship between the optical image and the imaging element caused by movement of the imaging device around an axis parallel to an optical axis of the lens unit. The lens unit has a first optical system that forms a first optical image from a first perspective on the imaging element and a second optical system that forms a second optical image from a second perspective on the imaging element. The system controller is configured to halt operation of the rotation corrector when the lens unit is supported by the lens mount.

21 Claims, 13 Drawing Sheets

(56) References Cited

FOREIGN PATENT DOCUMENTS

| JP | 2006-171082 A | 6/2006 |
| JP | 2006-171528 A | 6/2006 |
| JP | 2008-141518 A | 6/2008 |
| JP | 2008-187385 A | 8/2008 |
| JP | 2008-257033 A | 10/2008 |
| JP | 2010-103895 A | 5/2010 |
| JP | 2011-095431 A | 5/2011 |

* cited by examiner

IMAGING DEVICE

CROSS-REFERENCE TO RELATED APPLICATIONS

This application claims priority under 35 U.S.C. §119 to Japanese Patent Application No. 2010-274291, filed on Dec. 9, 2010 and Japanese Patent Application No. 2011-263795, filed Dec. 1, 2011. The entire disclosure of Japanese Patent Application No. 2010-274291 and Japanese Patent Application No. 2011-263795 are hereby incorporated herein by reference.

BACKGROUND

1. Technical Field

The technology disclosed herein relates to an imaging device. More specifically, the technology disclosed herein relates to an imaging device having a function for capturing 3D images (i.e., stereo images).

2. Background Information

As 3D has become increasingly popular in television and films in recent years, the trend is toward providing an environment in which the average user can easily view 3D images. In conjunction with this, there have been proposals for cameras and other such imaging devices capable of 3D imaging.

For example, in Japanese Laid-Open Patent Application 2001-109089 (hereinafter referred to as "Patent Literature 1") is proposed a stereo imaging device composed of a two-system camera, with which an image with a good 3D feel can be captured even though a small lens is used. In Japanese Laid-Open Patent Application H5-7374 (hereinafter referred to as "Patent Literature 2") is proposed a stereo imaging device having a prism for obtaining left and right images with parallax, and this camera has a configuration that yields left and right parallax images with a single system, so the stereo imaging device can be obtained with a simple configuration.

Unlike 2D images, 3D images need to go through a process in which a person perceives an image as a stereo image in his brain from images with parallax. Accordingly, there is the risk that the result will cause an observer discomfort if the image has not been suitably adjusted by matching the images seen with the eyes to the process by which a person perceives a stereo image. Therefore, as in Japanese Laid-Open Patent Application 2008-187385 (hereinafter referred to as "Patent Literature 3"), there has been proposed a device with which, when a 3D image is captured with an imaging device that is compatible with 3D, changes the camera control method (in the case of Patent Literature 3, the period of exposure control, etc.) is changed by comparing to when a 2D image is captured.

Thus, with an imaging device capable of capturing 3D images, various considerations are taken into account besides just acquiring an image, such as how attractive the captured image looks, and safety. On the other hand, just as when capturing a 2D image, one of the things to which attention must be paid during the capture of a 3D image is blurring of the image caused by hand shake that occurs when the imaging device is held in the hands. This generally causes a phenomenon that is called visually induced motion sickness, so a risk with a 3D image is that blurring of the image will cause the observer more discomfort than with a 2D image.

As a technique for correcting image blurring caused by hand shake in hand-held imaging, there is a method in which movement of the imaging device is detected with an acceleration sensor, and the drive of a variable angle prism provided to the imaging optical system is controlled according to the result of this movement detection (see, for example, Japanese Laid-Open Patent Application S62-153816 hereinafter referred to as "Patent Literature 4").

With the imaging device in Patent Literature 4, a variable angle prism, in which the interior of two sheets of glass connected with a special corrugated film is filled with a liquid having a high refractive index, is provided ahead of a solid state imaging element. The two sheets of glass of this variable angle prism are inclined in the horizontal and vertical directions, respectively, on the basis of information about the movement of the imaging device obtained from the acceleration sensor, and the optical axis of incident light is thereby bent, and movement of the captured image is stabilized.

In another example, there has been a proposal for an imaging optical system having a focus adjusting group or a zoom optical group, and a correcting optical mechanism in which the optical axis of this imaging optical system is inclined or made eccentric, as in Japanese Laid-Open Patent Application H5-66450 (hereinafter referred to as "Patent Literature 5"), for instance. With the imaging device in Patent Literature 5, a lens that is part of the imaging optical system composed of four lens groups shown in FIG. 2 of Patent Literature 5 is incorporated into a mechanism that is able to move up, down, left, and right via the slide shafts shown in FIG. 4 of Patent Literature 5, for example. This lens is moved by an electromagnetic actuator comprising a magnet and a coil, and this causes the optical axis of the imaging optical system to be eccentric or inclined. With this configuration, blurring of the image caused by shaking of the imaging device can be corrected by moving the slidable portion with the slide shafts (45y and 45p in FIG. 4 of Patent Literature 5) by means of the electromagnetic actuator according hand shaking during imaging.

Also, Japanese Laid-Open Patent Application H7-128619 (hereinafter referred to as "Patent Literature 6") discloses a zoom optical system comprising an anti-shake mechanism designed so that blurring of the image is corrected when the zoom optical system vibrates, which is accomplished by moving a relatively small and lightweight lens group that constitutes part of the zoom optical system in a direction perpendicular to the optical axis.

Also, Japanese Laid-Open Patent Application H9-261524 (hereinafter referred to as "Patent Literature 7") discloses a method in which image movement is corrected by moving an imaging element (specifically, CCD) in a direction perpendicular to the optical axis.

Further, Japanese Laid-Open Patent Application H4-331586 (hereinafter referred to as "Patent Literature 8"), for example, discloses a video camera having means for detecting the inclination of the camera body, decision means for deciding the extent of the inclination from a signal obtained by the detection means, means for rotating an imaging element, and means for controlling the rotation means. Japanese Laid-Open Patent Application 2006-171528 (hereinafter referred to as Patent Literature 9) discloses a camera capable of moving the imaging element in three directions: the roll direction whose center axis is the optical axis, and the left-right and up-down directions perpendicular to the optical axis.

In Patent Literature 4 to 7 and Patent Literature 9, an angular velocity sensor (so-called gyro sensor) which detects shaking of the imaging device is used for blurring detection. More specifically, the shake angle of the imaging device is found by performing integration on the angular velocity of movement of the imaging device detected by the angular velocity sensor, and drive of the above-mentioned variable angle prism or the like is controlled according to this shake angle. Also, in the example of Patent Literature 8, the means for detecting the inclination of the camera was one that made use of gravitational force or acceleration, and inclination of the captured image (shake in the roll direction) was cancelled out by rotationally driving the imaging element according to the inclination of the camera body.

SUMMARY

It is common knowledge that various methods have been proposed in relation to ways to correct blurring of the image caused by hand shake. Of these, however, serious problems are encountered when movement correction in the roll direction of the camera, as discussed in Patent Literature 8 and 9, is introduced into an imaging device that captures 3D images. For example, it has been discovered that with a 3D imaging device of the type that captures two (left and right) images with parallax, if there is positional offset in the vertical direction of the left and right images, a difference in the size of the left and right images (that is, a difference in the angle of view), or the like, when the captured 3D is observed, this difference can cause considerable discomfort to the observer. Accordingly, during the manufacture of a 3D imaging device that gives two parallax images, care is generally taken to ensure that there is none of the above-mentioned positional offset or size difference between parallax images, which is accomplished by means of calibration, adjustment after assembly, and maintaining high design precision of the optical system.

However, when the movement correction in the roll direction of the camera given in Patent Literature 8 and 9 is introduced into a camera that captures two images with parallax with a single imaging element, such as that given in Patent Literature 2, the movement correction in the roll direction itself causes positional offset in the vertical direction between the two (right and left) images.

The technology disclosed herein was conceived in light of the above problem, and it is one object thereof to provide an imaging device with which the movement correction in the roll direction is halted during the capture of a 3D image with a camera that has the function of correcting image blurring in the roll direction, and that captures two images with parallax with a single imaging element, with the result being that there is less positional offset in the vertical direction between the two (right and left) images that would otherwise be caused by movement correction in the roll direction, so a 3D image that causes an observer less discomfort can be captured.

To solve the above problem, a imaging device comprises a lens mount, an imaging element, a system controller, a sensor and a rotation corrector. The rotation corrector is configured to reduce change in the positional relationship between the optical image and the imaging element caused by movement of the imaging device around an axis parallel to an optical axis of the lens unit. The lens unit has a first optical system that forms a first optical image from a first perspective on the imaging element and a second optical system that forms a second optical image from a second perspective on the imaging element. The system controller is configured to halt operation of the rotation corrector when the lens unit is mounted to the lens mount.

These and other objects, features, aspects and advantages of the present invention will become apparent to those skilled in the art from the following detailed description, which, taken in conjunction with the annexed drawings, discloses example embodiments of the present invention.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1. Simplified Configuration of Imaging Device

Figure 1:
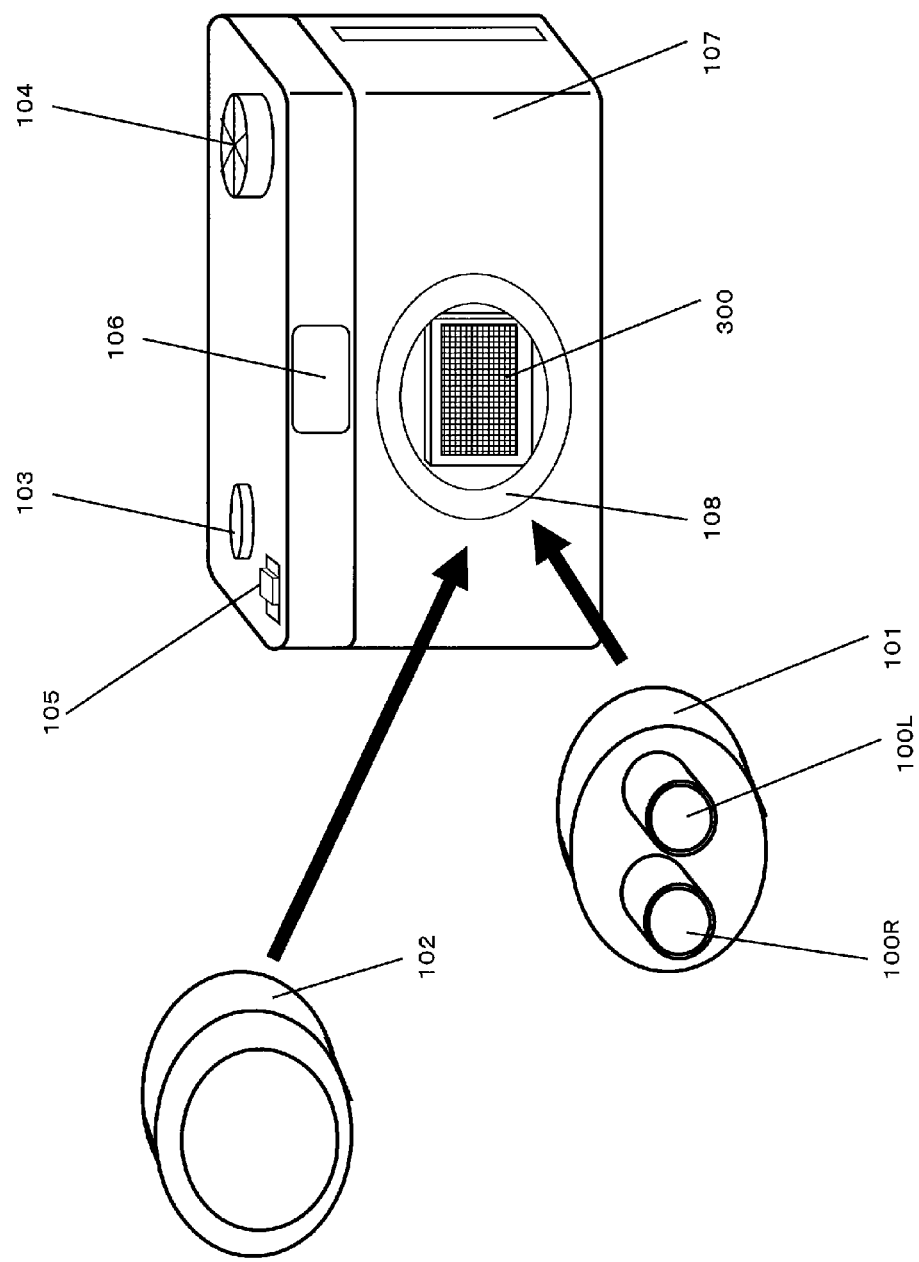
FIG. 1 is a view of the imaging device according to a first embodiment.

FIG. 1 is a view of the imaging device in a first embodiment. The imaging device shown in FIG. 1 is an interchangeable lens type of camera. When a 3D image is to be captured, a lens barrel 101 (an example of a 3D optical system) having two imaging lenses 100R (on the right side facing toward the subject) and 100L (on the left side facing toward the subject) is mounted to a camera body 107. A 3D image can be captured on the basis of two images with parallax in the left and right direction obtained through these two imaging lenses 100R and 100L. An ordinary lens barrel 102 composed of a single imaging lens is used when a 2D image is to be captured. This imaging device can also capture a 2D image by using just one of the two imaging lenses 100R and 100L mounted to the lens barrel 101.

The camera body 107 comprises a record on/off switch 103, a mode switch 104, a zoom lever 105, a strobe 106, a lens mount 108 (an example of a mount), and an imaging element 300.

The mode switch 104 switches the imaging mode, such as 2D imaging or 3D imaging, and moving picture imaging or still picture imaging. The zoom lever 105 is used to change the focal distance of the lens of the lens barrel (the lens barrel 101 or lens barrel 102) that is mounted to the camera body 107. The strobe 106 is used in imaging a dark subject. The record on/off switch 103 is pressed once in moving picture recording mode to begin moving picture recording, and is pressed again to stop the recording. In still picture imaging mode, imaging is executed every time the record on/off switch 103 is pressed.

The lens mount 108 is a member for mounting a lens barrel to the camera body 107. The lens mount 108 is provided with an electrical contact for exchanging information between the camera body 107 and the lens barrel that has been mounted. When communication is performed between the lens barrel and the camera body 107 via this electrical contact, information about the mounted lens barrel (such as whether it is intended for 2D or 3D imaging, the focal distance range (zoom ratio) of the lens, the optical characteristics of the lens barrel, its serial number, etc.) is recognized on the camera body 107 side.

2. Internal Configuration of Imaging Device

Figure 2:
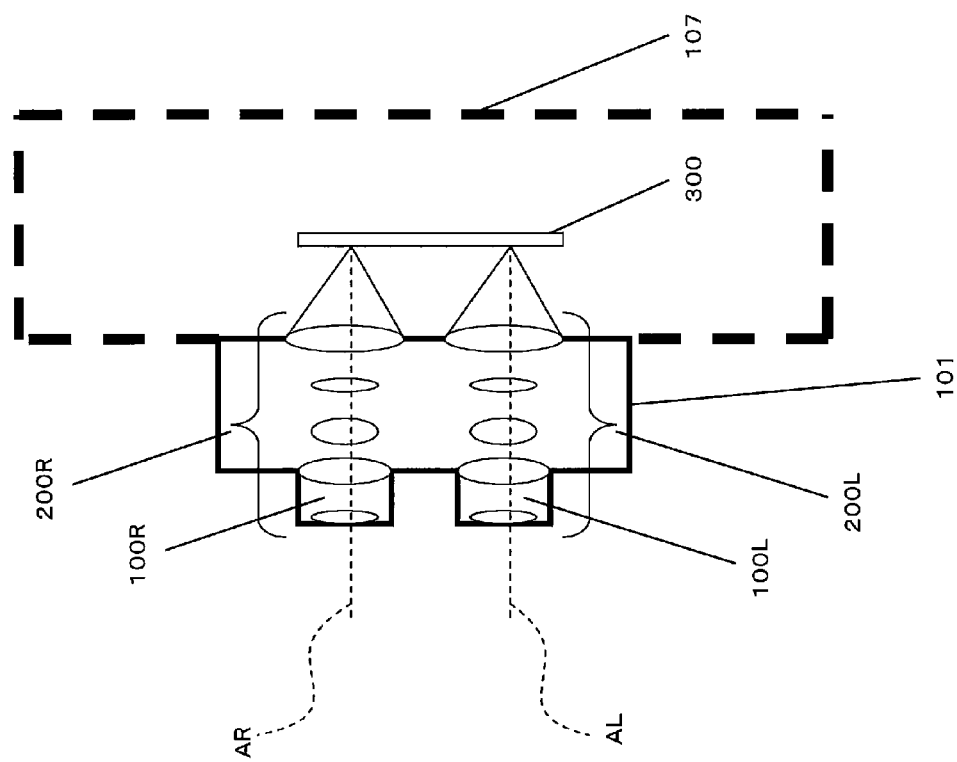
FIG. 2 is a cross section of a lens barrel 101 and a camera body 107 according to the first embodiment.

FIG. 2 is a cross section as seen from above the two imaging lenses 100R and 100L and the imaging element 300 have been cut along a horizontal plane, when the lens barrel 101 shown in FIG. 1 has been mounted to the camera body 107. In FIG. 2 there are shown a plurality of optical lens groups 200R constituting the imaging lens 100R, and a plurality of optical lens groups 200L constituting the imaging lens 100L. The two optical images formed via the two imaging lenses 100R and 100L are formed on the imaging element 300. Also, in FIG. 2, the center line between the two optical axes AR and AL of the two imaging lenses 100R and 100L substantially coincides with the center line of the imaging element 300 in the left and right direction.

3. Functional Configuration of Camera Body

Figure 3:
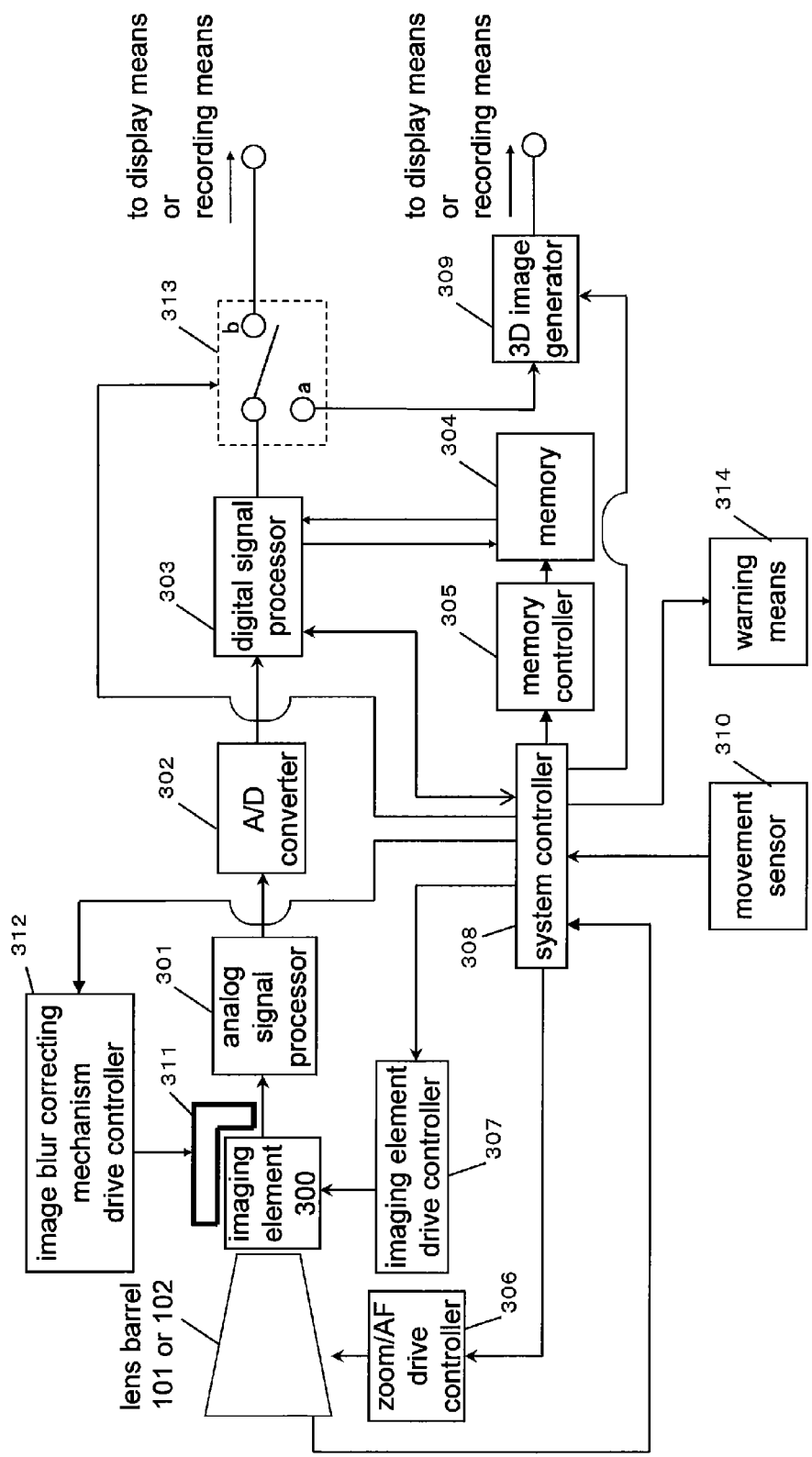
FIG. 3 is a block diagram of the camera body 107 according to the first embodiment.

FIG. 3 is a block diagram of the functional configuration of the camera body 107 shown in FIG. 1. The imaging element 300 is an opto-electrical conversion device that converts a subject image into an electrical signal (image signal). Examples include a CCD image sensor and a CMOS image sensor.

An analog signal processor 301 subjects the image signal obtained from the imaging element 300 to processing such as noise elimination and gain adjustment. The image signal that has undergone this processing is converted into a digital signal by an A/D converter 302.

The signal that has been converted into a digital signal by the A/D converter 302 is sent to a digital signal processor 303.

The digital signal processor 303 executes the digital processing required by the camera, such as the separation of brightness signals and color differential signals, noise elimination, gamma correction, sharpness improvement processing, and electronic zoom processing. Also, the digital signal processor 303 detects a change in the contrast of the image signal that is captured, selects information required for focal control (auto-focus) of the mounted lens barrel, and supplies this information to a system controller 308 (discussed below).

A memory 304 stores signals that have passed through the digital signal processor 303. Stored signals are not limited to signals that have been processed by the digital signal processor 303. The memory 304 can also be used as a buffer memory so that "a signal supplied from the A/D converter 302 is temporarily stored in the memory 304, just the required signal is read from the memory 304 in block units, for example, and processed by the digital signal processor 303, and once again written to the memory 304."

A memory controller 305 controls the recording of signals to the memory 304 and the reading of signals from the memory 304 under the direction of the system controller 308 (discussed below).

A zoom/AF driver 306 drives a zoom motor and a focus motor (not shown) installed in the mounted lens barrel according to a command signal from the system controller 308 (discussed below), and thereby adjusts the zoom ratio and focal position (focal adjustment) of the lens barrel 101 or 102.

An imaging element drive controller 307 controls the drive of the imaging element 300 by supplying pulse signals for controlling the exposure timing of the imaging element 300, the signal read timing, and electronic shutter operation, according to command signals from the system controller 308.

The system controller 308 provides commands for unified control over the zoom/AF driver 306, the imaging element drive controller 307, the digital signal processor 303, and the memory controller 305, as well as a 3D image generator 309, an image blur correcting mechanism 311, an image blur correcting mechanism drive controller 312, and a switch 313 (all discussed below), based on information supplied from the digital signal processor 303 and a movement sensor 310 (discussed below) and on the state of the mode switch 104 and the zoom lever 105, so that these components operate suitably and in conjunction with each during image capture. The system controller 308 is composed of a microprocessor and control programs stored therein, for example.

The 3D image generator 309 generates a final 3D image on the basis of the subject images obtained from the two imaging lenses 100R and 100L when the lens barrel 101 has been mounted to the camera body 107. In this embodiment, a 3D moving picture produced by time division is recorded by the recording means (not shown; such as a hard disk or a semiconductor memory card) of the camera body 107, and is displayed by a display means (not shown; such as an LCD monitor).

The movement sensor 310 (an example of a sensor) is, for example, a gyro sensor (angular velocity sensor) or another such physical sensor, and is incorporated internally into the camera body 107 shown in FIG. 1. The movement sensor 310 outputs angular velocity data according to the movement of the camera in three directions, namely, the pitch direction (the up and down direction), the yaw direction (the left and right direction), and the roll direction, and supplies this data to the system controller 308.

The image blur correcting mechanism 311 is used to cancel out blurring of the image caused by the shaking of the user's hands during hand-held imaging, and is a mechanism for allowing the imaging element 300 to move in three directions, namely, the up and down direction and left and right direction perpendicular to the optical axis of the imaging lenses installed in the lens barrel, and the roll direction whose axis is the optical axis of the imaging lenses (when the lens barrel 101 is mounted, the center lines of the two optical axes AR and AL of the two imaging lenses 100R and 100L). As to the mechanism for moving the imaging element in three directions (up and down, left and right, and roll), the mechanism discussed in Patent Literature 9 (Japanese Laid-Open Patent Application 2006-171528) may be used, for example.

The image blur correcting mechanism drive controller 312 is made up of a servo circuit and a motor for driving the image blur correcting mechanism 311. The image blur correcting mechanism drive controller 312 receives a command from the system controller 308 and drives the image blur correcting mechanism 311, and thereby controls the system so as to cancel out blurring of the image caused by the shaking of the user's hands during hand-held imaging. In this embodiment, the image blur correcting mechanism drive controller 312 constitutes a "rotation corrector" along with the image blur correcting mechanism 311.

The switch 313 is used to switch the image recorded or displayed by the imaging device in this embodiment between a 2D image and a 3D image. When the lens barrel 101 has been mounted to the camera body 107, for example, the system controller 308 recognizes that the mounted lens barrel is intended for 3D imaging, and switches the switch 313 to the a side in FIG. 3. Consequently, the output of the digital signal processor 303 is switched to the 3D image generator 309 side. Also, when the lens barrel 102 has been mounted, the system controller 308 recognizes that the mounted lens barrel is intended for 2D imaging, and switches the switch 313 to the b side in FIG. 3. Consequently, the output of the digital signal processor 303 is switched to the b side in FIG. 3, and a 2D image is outputted.

A warning means 314 is used to generate a warning to be conveyed to the user, or a display of the internal content of the imaging device, and is a means for performing display and warning that are required, such as a warning sound, a liquid crystal display, or the like.

4. Operation of Imaging Device

The operation of the imaging device of this embodiment constituted as above will now be described.

(1) Operation in 2D Imaging Mode

First, let us assume that the mode switch 104 of the imaging device is set ahead of time by the user to 2D moving picture imaging mode, and that the lens barrel 101 for 3D imaging has been mounted to the camera body 107.

Figure 4:
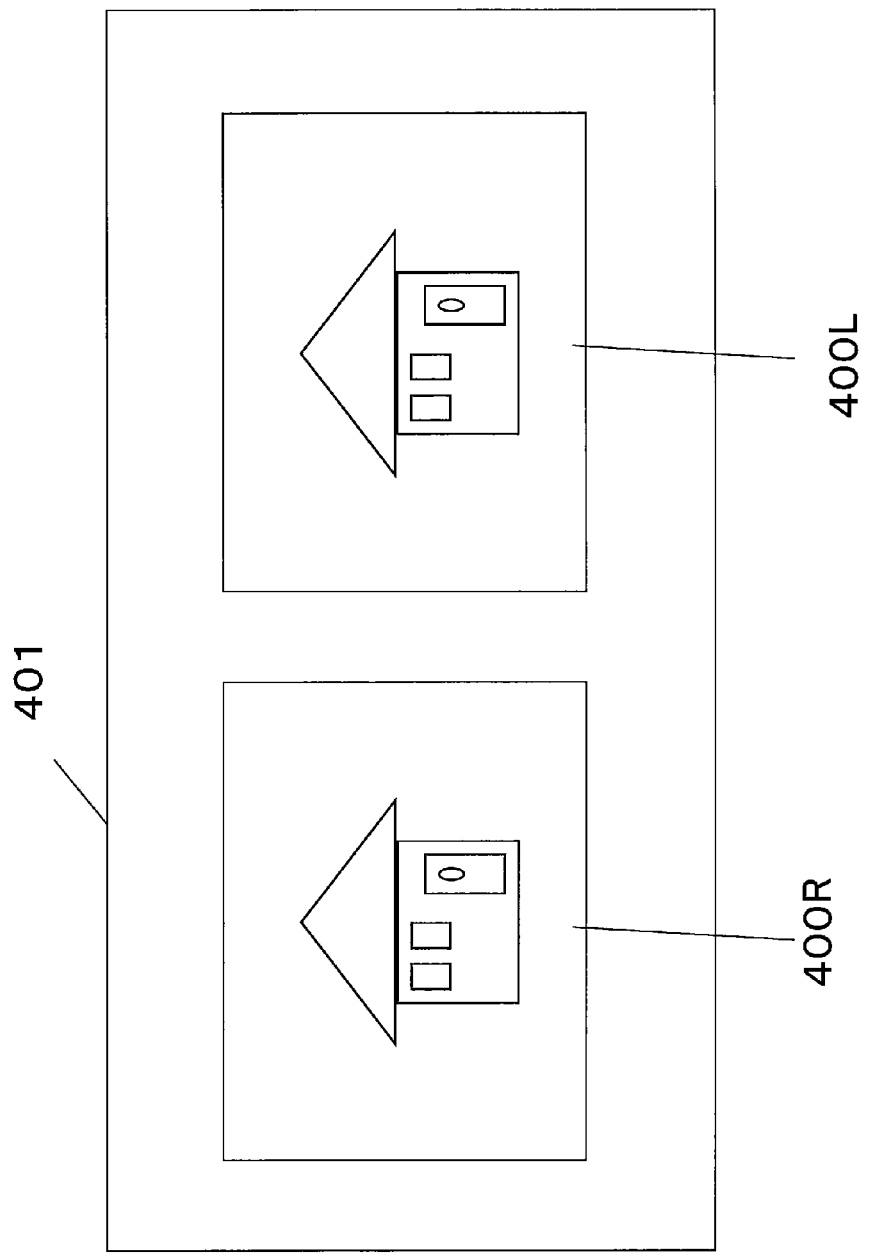
FIG. 4 is an example of the image on an imaging element 300 according to the first embodiment.

If the imaging device is fixed on a tripod or the like, and the operation of the image blur correcting mechanism 311 is set to a stopped state with a manipulation switch (not shown), the subject image that is formed on the imaging element 300 is as schematically represented in FIG. 4. Here, we will assume that the axis that passes through the approximate center of the imaging plane of the imaging element 300 and is perpendicular to the imaging plane substantially coincides with the axis that is parallel with the two optical axes AR and AL of the two imaging lenses 100R and 100L and passes through the center of these two optical axes. Furthermore, we will assume that in a plan view of the imaging plane, the line that links the two optical axes AR and AL of the two imaging lenses 100R and 100L is substantially parallel to a horizontal line in the imaging region of the imaging element 300, and the imaging element does not rotate in the roll direction.

FIG. 4 shows a rectangular region 400R, a rectangular region 400L, and an overall imaging region 401. The rectangular region 400R is a region that is utilized as the image that is recorded or displayed by the imaging device out of the image formed by the imaging lens 100R. Similarly, the rectangular region 400L is a region that is utilized as the image that is recorded or displayed by the imaging device out of the image formed by the imaging lens 100L. The overall imaging region 401 is the total imaging region of the imaging element 300. In this embodiment, we will assume that out of the image obtained with the imaging element 300, the region that is utilized as the image outputted by the imaging device is a rectangular region at a fixed position indicated by the rectangular regions 400R and 400L. The imaging region formed by optical lenses is generally substantially circular, but is not depicted here in order to simplify the description. In 2D imaging mode, the rectangular region 400L is selected out of the two left and right images, and is what is outputted by the imaging device.

Figure 5:
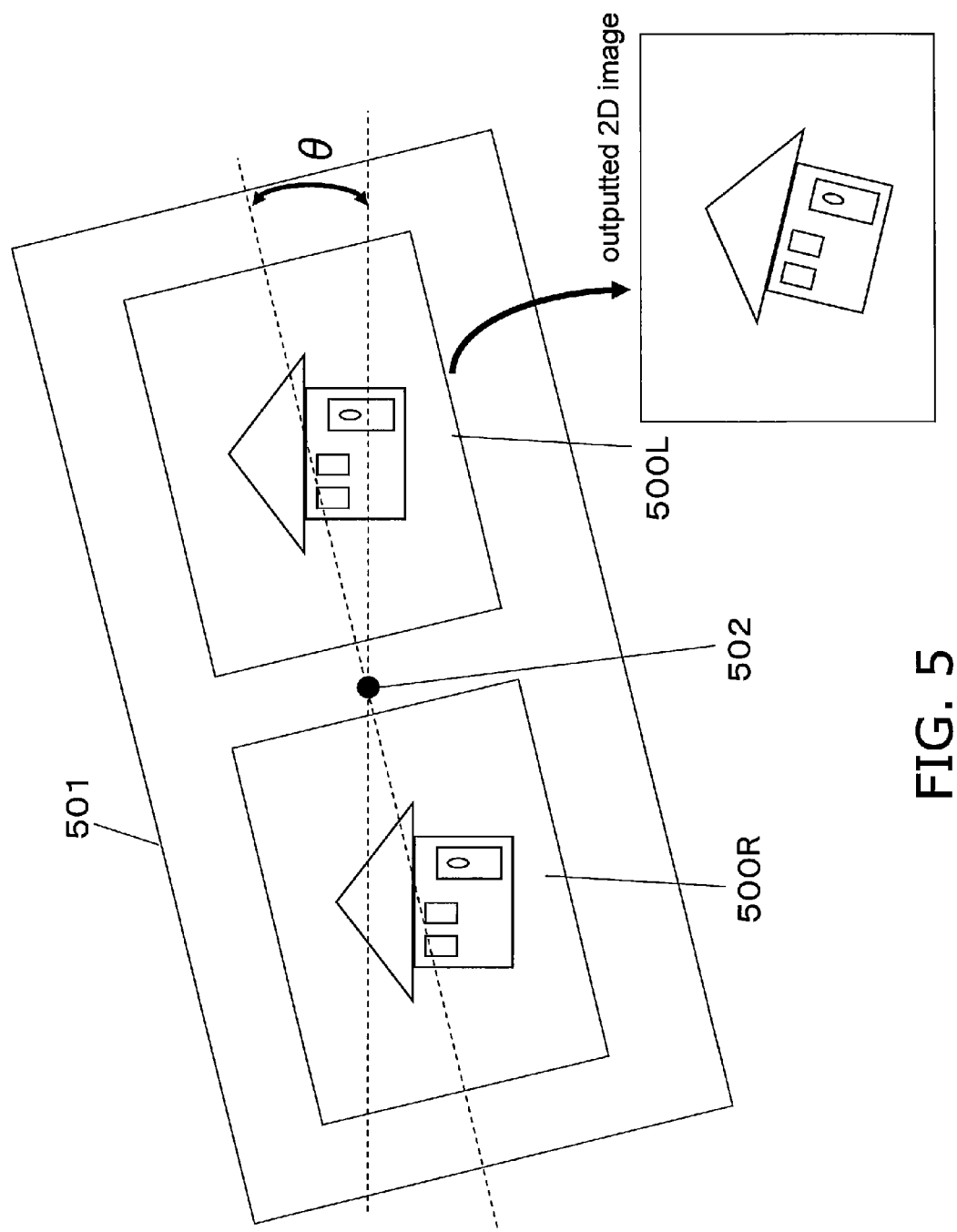
FIG. 5 is an example of the image on an imaging element 300 according to the first embodiment.
Figure 6:
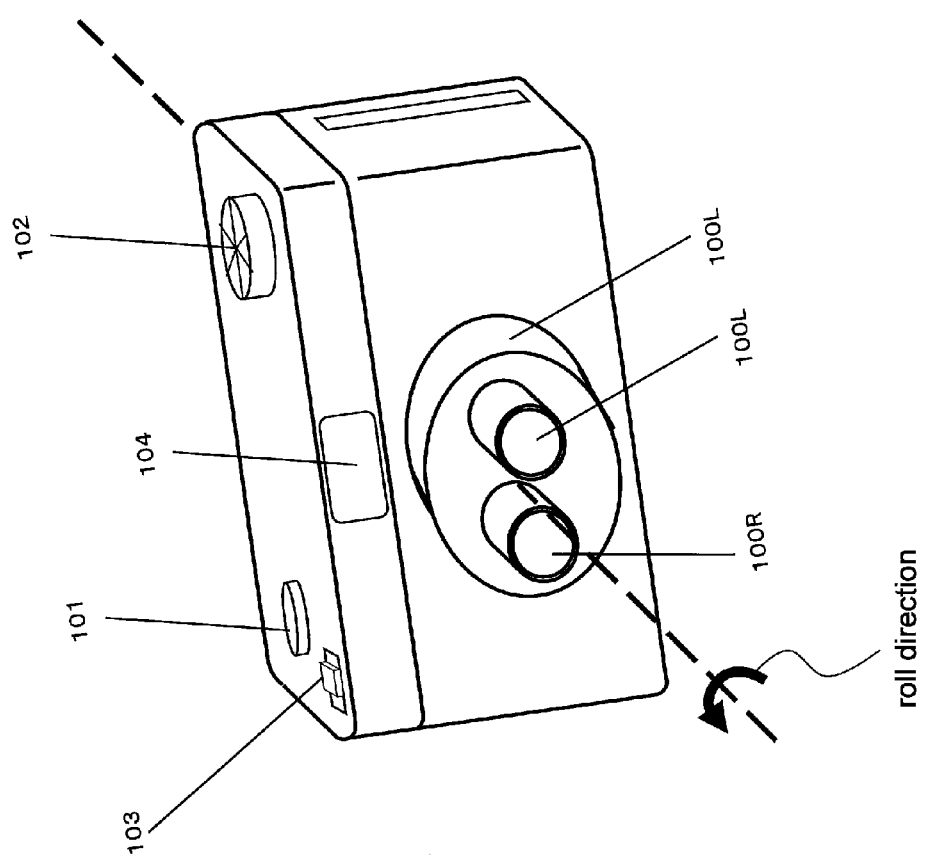
FIG. 6 is a view of when the imaging device according to the first embodiment has been tilted in the roll direction.

Next, when the imaging device has rotated in the roll direction in hand-held imaging, the subject image formed on the imaging element 300 is as shown in FIG. 5. FIG. 5 is a simplified diagram of the subject image formed on the imaging element 300 in a state in which the imaging device has rotated in the roll direction as shown in FIG. 6. FIG. 5 shows a rectangular region 500R, a rectangular region 500L, an overall imaging region 501, and a rotational axis 502. The rectangular region 500R is a region that is utilized as the image recorded or displayed by the imaging device out of the image formed by the imaging lens 100R. Similarly, the rectangular region 500L is a region that is utilized as the image recorded or displayed by the imaging device out of the image formed by the imaging lens 100L. The overall imaging region 501 is the total imaging region of the imaging element 300, and the rotational axis 502 is the rotational axis (rotational center) when the imaging device has rotated in the roll direction.

As shown in FIG. 5, when the imaging device rotates in the roll direction, the 2D image that is outputted is, of course, an image in which the subject is rotated (inclined). In this case, once the image blur correcting mechanism 311 is activated, the imaging device computes the rotational angle from the amount of rotation of the imaging device in the roll direction (the angular velocity in the rotational direction) detected by the movement sensor 310. The imaging device then corrects the rotation (inclination) of the subject image by using the image blur correcting mechanism 311 to rotate the imaging element 300 in the opposite direction from the roll direction, according to the rotational angle. In addition to the roll direction, the same applies to the up and down direction (or the pitch direction) and the left and right direction (or the yaw direction) of the imaging device, in which the amount of movement is computed from the movement of the imaging device (angular velocity in the rotational direction) detected by the movement sensor 310. The imaging device then displaces the imaging element 300 with the image blur correcting mechanism 311 according to the computed amount of movement, and corrects blurring of the image attributable to movement of the imaging device. Any technique that is already known may be used to correct this blurring of the image (movement) of the image, and this will not be described in detail here.

(2) Operation in 3D Imaging Mode

Next, operation in a mode of capturing a 3D image will be described.

First, we will describe problems encountered when using the image blur correcting mechanism 311 to perform movement correction in the roll direction during 3D imaging, and then will describe operation in which movement correction in the roll direction by the image blur correcting mechanism 311 is automatically stopped during 3D imaging.

Figure 7:
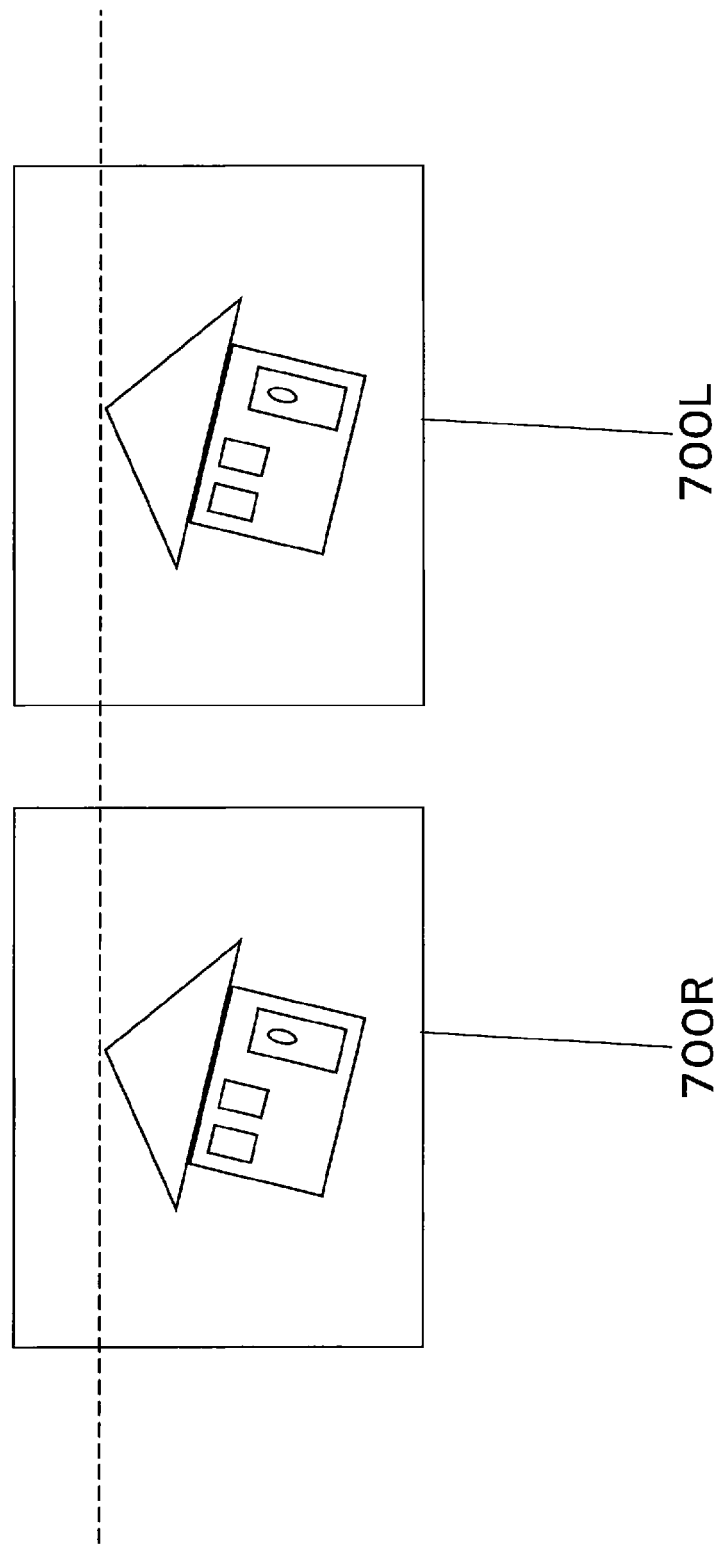
FIG. 7 is an example of the left and right images captured according to the first embodiment.

First, even when the user manipulates the mode switch 104 to select 3D imaging mode, if the imaging device is positioned horizontally, the image shown in FIG. 4 is formed on the imaging element 300. On the other hand, if the imaging device is rotated in the roll direction, the image shown in FIG. 5 is formed on the imaging element 300. Here, when the imaging device has rotated in the roll direction, if the operations of the image blur correcting mechanism 311 is in a stopped state, the two images with parallax outputted from the imaging device will be as shown in FIG. 7, for example. FIG. 7 shows images 700R and 700L corresponding to the rectangular regions 500R and 500L, respectively, of FIG. 5, and the images 700R and 700L have subject images that incline along with the rotation of the imaging device in the roll direction. When images with these tilted subjects are observed in 3D view, aside from whether the composition is good or not, the observer will not experience any particular discomfort.

Figure 8:
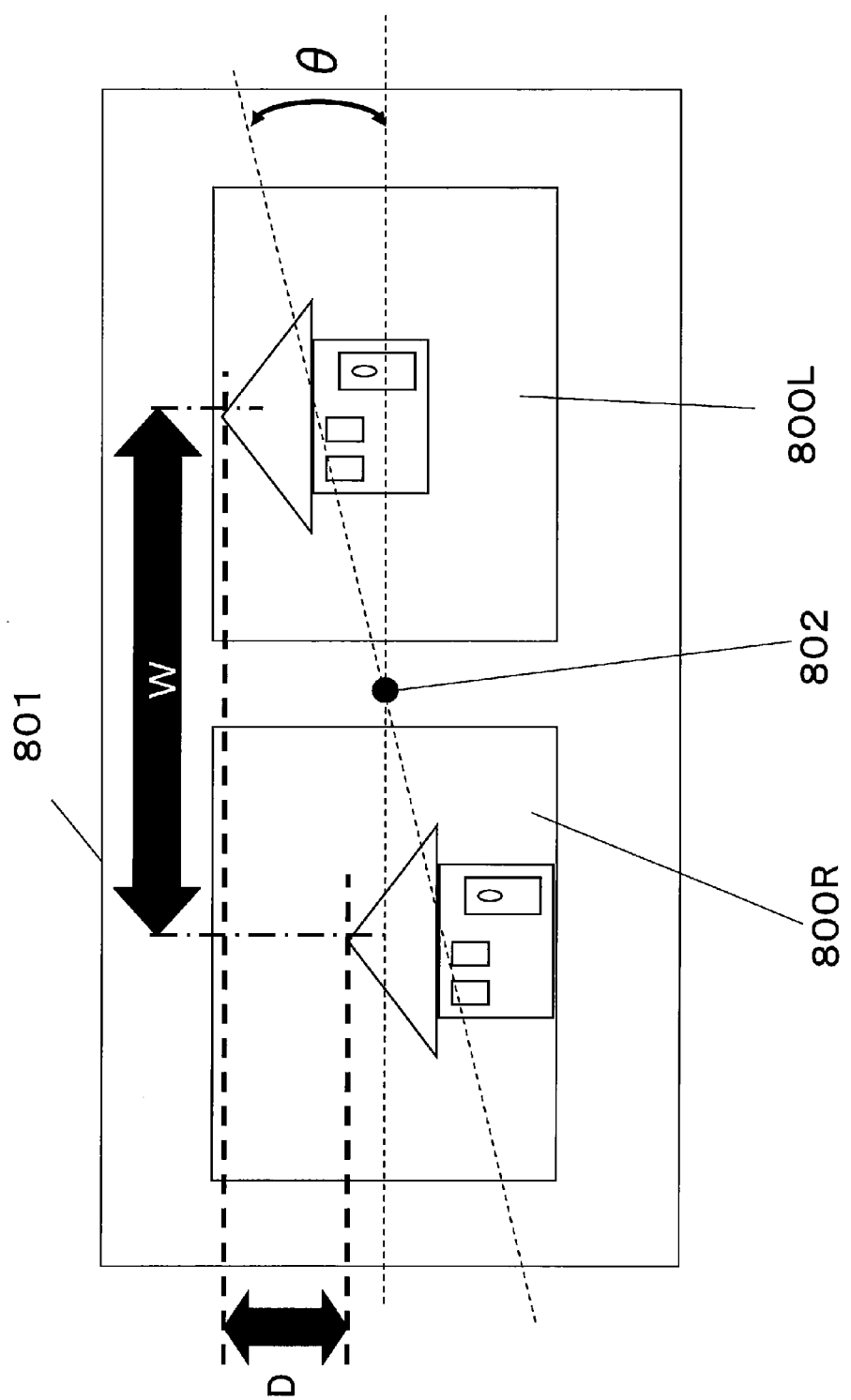
FIG. 8 is an example of the image on an imaging element 300 according to the first embodiment.

However, if the image blur correcting mechanism 311 were actuated to correct the rotation in the roll direction, the subject image formed on the imaging element 300 would be as shown in FIG. 8. FIG. 8 shows a rectangular region 800R, a rectangular region 800L, an overall imaging region 801, and a rotational axis 802. The rectangular region 800R is a region that is utilized as the image that is recorded by the imaging device out of the image formed by the imaging lens 100R. The rectangular region 800L is a region that is utilized as the image out of the image formed by the imaging lens 100L. The overall imaging region 801 is the total imaging region of the imaging element 300, and the rotational axis 802 is the rotational axis when the imaging device rotates in the roll direction. The rotational axis 802 is the rotational center when the imaging element 300 is rotated in the opposite direction in order to correct rotation in the roll direction. As shown by the rectangular regions 800R and 800L in FIG. 8, positional offset in the up and down direction (the positional offset amount D in FIG. 8) occurs in the two left and right images captured when movement correction in the roll direction is performed in the capture of a 3D image.

As described above, performing movement correction in the roll direction can result in positional offset in the vertical direction between two left and right images. This positional offset can cause an observer considerable discomfort when viewing a 3D image.

In view of this, in this embodiment the system controller 308 halts movement correction in the roll direction, out of all the correction performed by the image blur correcting mechanism 311 during 3D imaging. As a result, the positional offset in the vertical direction between left and right images that is attributable to movement correction in the roll direction can be avoided.

Figure 9:
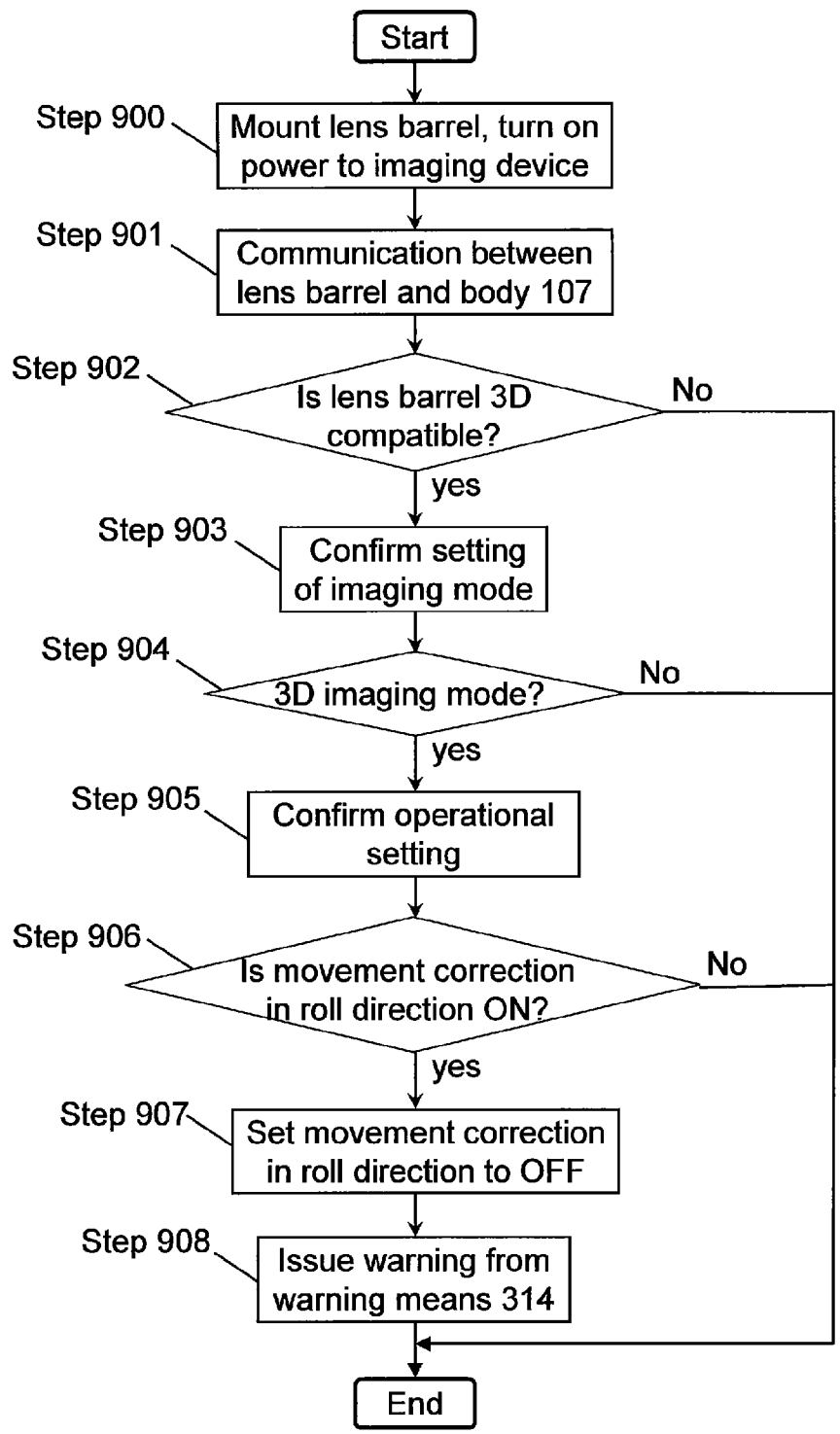
FIG. 9 is a flowchart illustrating the processing performed by a system control means 308 according to the first embodiment.

This operation will now be described through reference to FIG. 9. FIG. 9 is a flowchart illustrating how the system controller 308 automatically halts movement correction in the roll direction during 3D imaging. This operation can be accomplished by means of either hardware or software in the system controller 308.

As shown in FIG. 9, first the system controller 308 recognizes that a lens barrel has been mounted, that the power has been switched on to the imaging device, etc. (step 900). The system controller 308 acquires information about the lens barrel mounted to the camera body 107 through communication (step 901). The system controller 308 uses the result of communication in step 901 to decide whether the mounted lens barrel is intended for 2D or 3D use (step 902), and confirms the mode setting of the imaging device with the mode switch 104 if the lens barrel is for 3D use (step 903). The system controller 308 determines whether or not the imaging mode is 3D imaging mode (step 904), and if the imaging mode is 3D imaging mode, confirms the operational setting of the image blur correcting mechanism 311 with the manipulation switch (not shown) (step 905). The system controller 308 determines whether or not the image blur correcting mechanism 311 has been set to ON for movement correction in the roll direction (step 906), and if movement correction in the roll direction by the image blur correcting mechanism 311 has been set to ON, this is forcibly reset to OFF (step 907). The system controller 308 notifies the user that movement correction in the roll direction has been switched off (step 908). More specifically, the system controller 308 uses the warning means 314 to issue a warning sound from a speaker (not shown), or to present a display of "roll direction movement correction still set to OFF" on a display means (not shown).

5. Actions and Effects

As discussed above, by automatically setting so that movement in the roll direction is not corrected during the capture of a 3D image, it is possible to avoid the occurrence of positional offset in the vertical direction between two (left and right) parallax images caused by movement correction in the roll direction. Thus, an imaging device can be provided with which it is possible to capture a 3D image that reduces discomfort to an observer.

6. Modification Examples of First Embodiment (1) In this embodiment, movement correction in the roll direction was described with a constitution in which the imaging element 300 was rotated around the approximate center of the imaging element 300, but this is not the only option. For example, it is also possible to rotate the imaging element 300 around a different axis.

(2) Also, movement correction in the roll direction was described with a constitution in which the imaging element 300 was physically rotated, but this is not the only option. For example, it is obvious that the present invention is also effective when movement in the roll direction is corrected by rotating and cropping part of the image formed on the imaging element 300. In this case, the image cropper that rotates and crops part of the image constitutes a rotation corrector.

Figure 10:
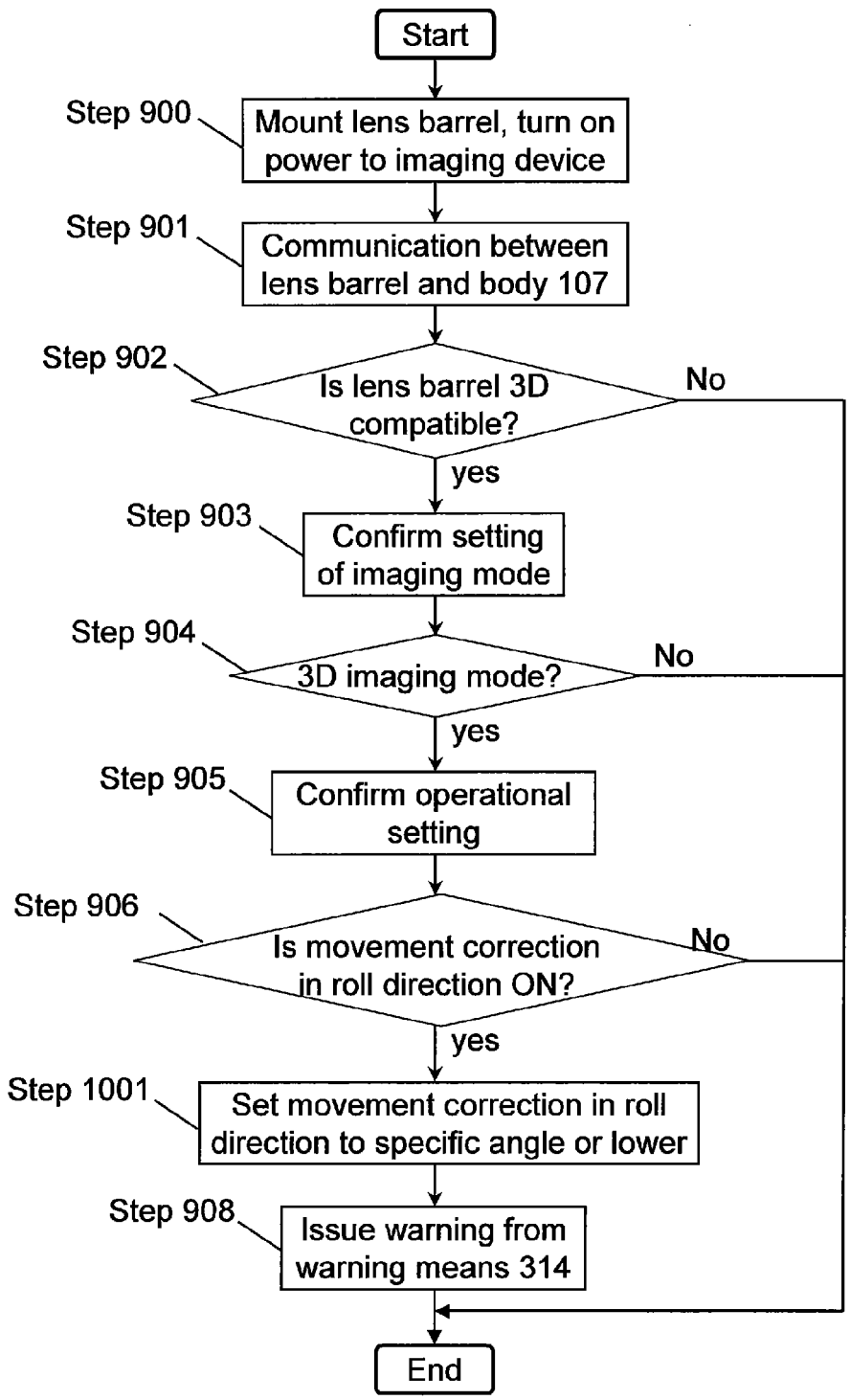
FIG. 10 is a flowchart illustrating the processing performed by a system control means 308 according to the first embodiment.

(3) Also, as described through reference to FIG. 9, in this embodiment movement correction in the roll direction was switch OFF during 3D imaging, but the constitution shown in FIG. 10 is also possible as an alternative. FIG. 10 differs from FIG. 9 only in that step 907 in FIG. 9 is changed to step 1001. In the flowchart in FIG. 10, the system controller 308 limits the image blur correcting function in the roll direction in step 1001 to no more than a specific angle. For example, the amount of offset D (see FIG. 8) of an image in the vertical direction between two left and right images during roll correction can be computed from Mathematical Formula 1. In Mathematical Formula 1, the distance between the left and right images on the imaging plane is an amount equivalent to the distance W in FIG. 8.

$$D = \text{(distance between the left and right images on the imaging plane)} \times \tan\theta \quad \text{Mathematical Formula 1}$$

In general, in a 3D image, it is known that an observer will not perceive any offset of an image in the vertical direction between two (left and right) images, nor will the observer have any trouble, as long as the amount of this offset is no more than a specific value. With the constitution in FIG. 10, this fact is utilized so that movement correction in the roll direction can be performed so that the amount of offset in the vertical direction between two (left and right) images will be kept to a specific value or less. If the constitution in FIG. 10 is employed, to the extent that there is no problem in observing the 3D image, inclination of the composition can be corrected and the quality of the captured image can be improved.

Figure 11:
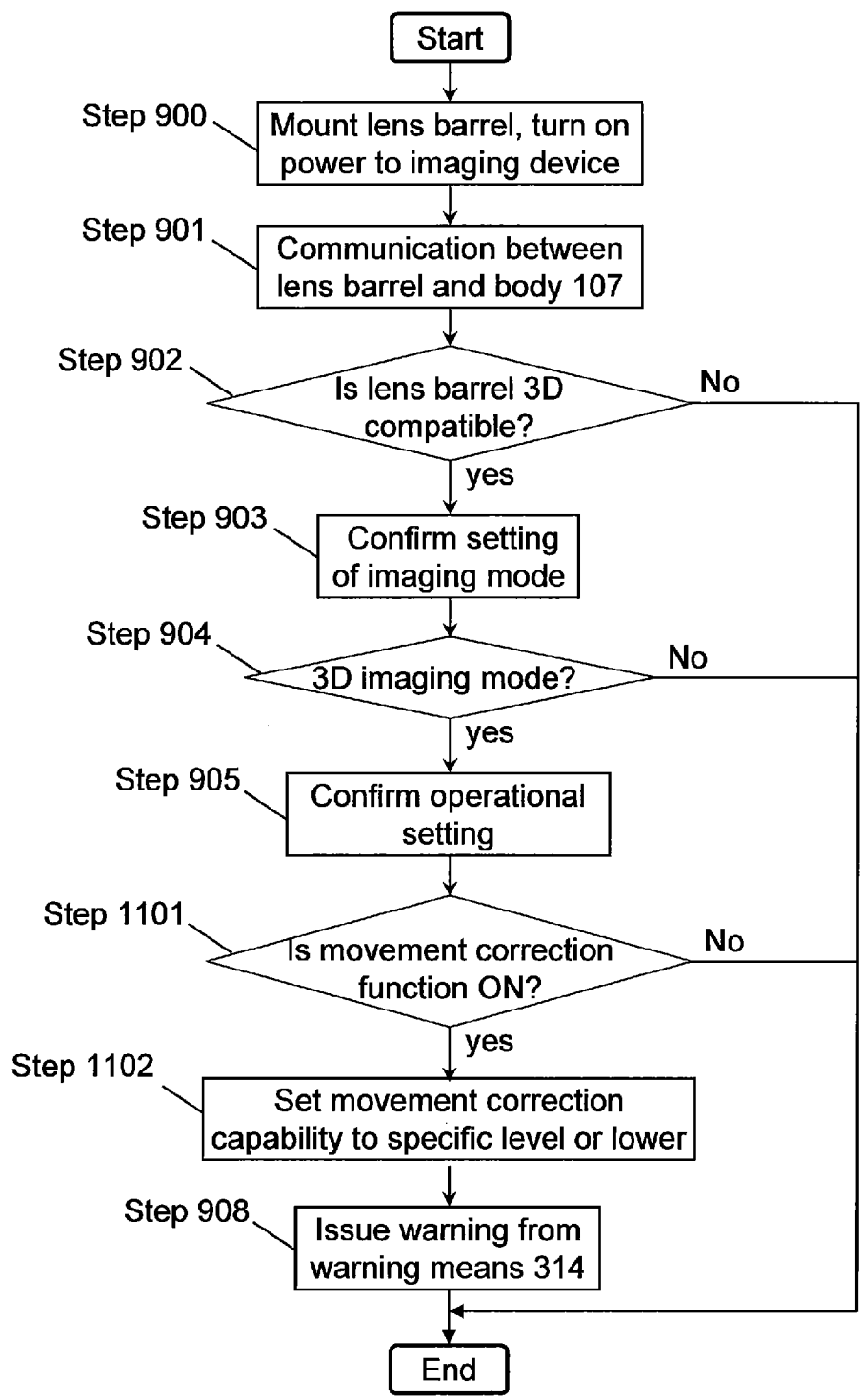
FIG. 11 is a flowchart illustrating the processing performed by a system control means 308 according to the first embodiment.

(4) Also, this embodiment focused on the fact that the result of movement correction in the roll direction creates offset in the image in the vertical direction between two (left and right) images, but the constitution shown in FIG. 11 is also conceivable, from another standpoint. FIG. 11 differs from FIG. 9 only in that steps 906 and 907 in FIG. 9 are changed to steps 1101 and 1102. In the flowchart of FIG. 11, the system controller 308 confirms in step 1101 whether the operation setting of the image blur correcting mechanism 311 (the setting of the correction function in any direction, and not just the roll direction) is ON. Next, if the image blur correcting function is ON in a given direction in step 1101 the system controller 308 in step 1102 limits the image blur correcting function in the given direction. With the above constitution, the operating capability of the image blur correcting mechanism 311 is limited to a specific level or lower during the capture of a 3D image. In general, with an interchangeable lens type of imaging device, because a 3D imaging lens imposes significant design limitations (limitations on the size, cost, etc.), there may be situations in which the peripheral light quantity or the peripheral resolution of the lens is designed to be lower than with an ordinary 2D imaging lens. In this case, when a 3D imaging lens is mounted, if movement correction is performed at the same capability (such as the correction range) as when a 2D imaging lens is mounted, there will be a drop in the resolution and the quantity of light around the captured image, and there is the risk that the resulting image will be of low quality. In view of this, with the constitution in FIG. 11, the image blur correcting function of the image blur correcting mechanism 311 is limited when a 3D imaging lens is mounted. With the constitution in FIG. 11, and with a 3D imaging lens, the image blur correcting function of the entire image blur correcting mechanism 311 is limited, but this is not the only option. For example, information about the peripheral light quantity or the peripheral resolution may be provided to the system controller 308 from the lens side during communication via the electrical contact of the lens mount 108 during lens mounting, and the system controller 308 may use this information to set a suitable image blur correcting function for the image blur correcting mechanism 311.

Second Embodiment

Next, as a second embodiment, we will describe an example of an imaging device capable of capturing a 3D image that reduces discomfort during observation by correcting positional offset in the vertical direction between two (left and right) images even when movement correction in the roll direction has been performed in 3D imaging mode. The basic constitution of the imaging device in this second embodiment is the same as that of the first embodiment shown in FIGS. 1, 2, and 3, so FIGS. 1, 2, and 3 will be referred to in the description, and only those portions that are different from the first embodiment will be described.

1. Configuration of Imaging Device

In the second embodiment, block diagrams showing the exterior of the imaging device, the configuration of the imaging lens, and the internal configuration are the same as FIGS. 1, 2, and 3. In the second embodiment, however, the operation of the imaging element 300, the imaging element drive controller 307, and the system controller 308 shown in FIG. 3 is different from that in the first embodiment.

More specifically, the imaging element 300 is, for example, a CMOS type of imaging element that can read any desired region on an imaging plane. With a CMOS type of imaging element, it is possible to read an image in any region with an X-Y address method. The imaging element drive controller 307 (an example of an image cropper) is a means for supplying pulse signals for controlling electronic shutter operation, signal read timing, and exposure timing of the imaging element 300. The imaging element drive controller 307 can read an image in any region on the imaging element 300. The imaging element drive controller 307 is able to read just the image signal from a desired location, out of the entire image signal captured by the imaging element 300, under a read location command from the system controller 308 (discussed below). Any known technique may be used for reading the desired region by X-Y address method from a CMOS or other type of imaging element, but this will not be described in detail here.

Unlike in the first embodiment, the system controller 308 is constituted so that movement correction in the roll direction is permitted in both 2D imaging mode and 3D imaging mode. When the user switches on the operation of the image blur correcting mechanism 311 with a manipulation switch (not shown), the system controller 308 performs movement correction in the roll direction even in 3D imaging mode. When movement correction in the roll direction is performed, the system controller 308 also calculates the rotational angle θ of the imaging device in the roll direction on the basis of the output from the movement sensor 310, and finds the amount of positional offset D in the vertical direction occurring between the two (left and right) images on the basis of Mathematical Formula 1. The system controller 308 is also configured so as to supply command signals to indicate the read region of an image signal to the imaging element drive controller 307 on the basis of the calculated amount of positional offset.

2. Operation of Imaging Device

The operation of the imaging device of the second embodiment constituted as above will now be described.

Figure 12:
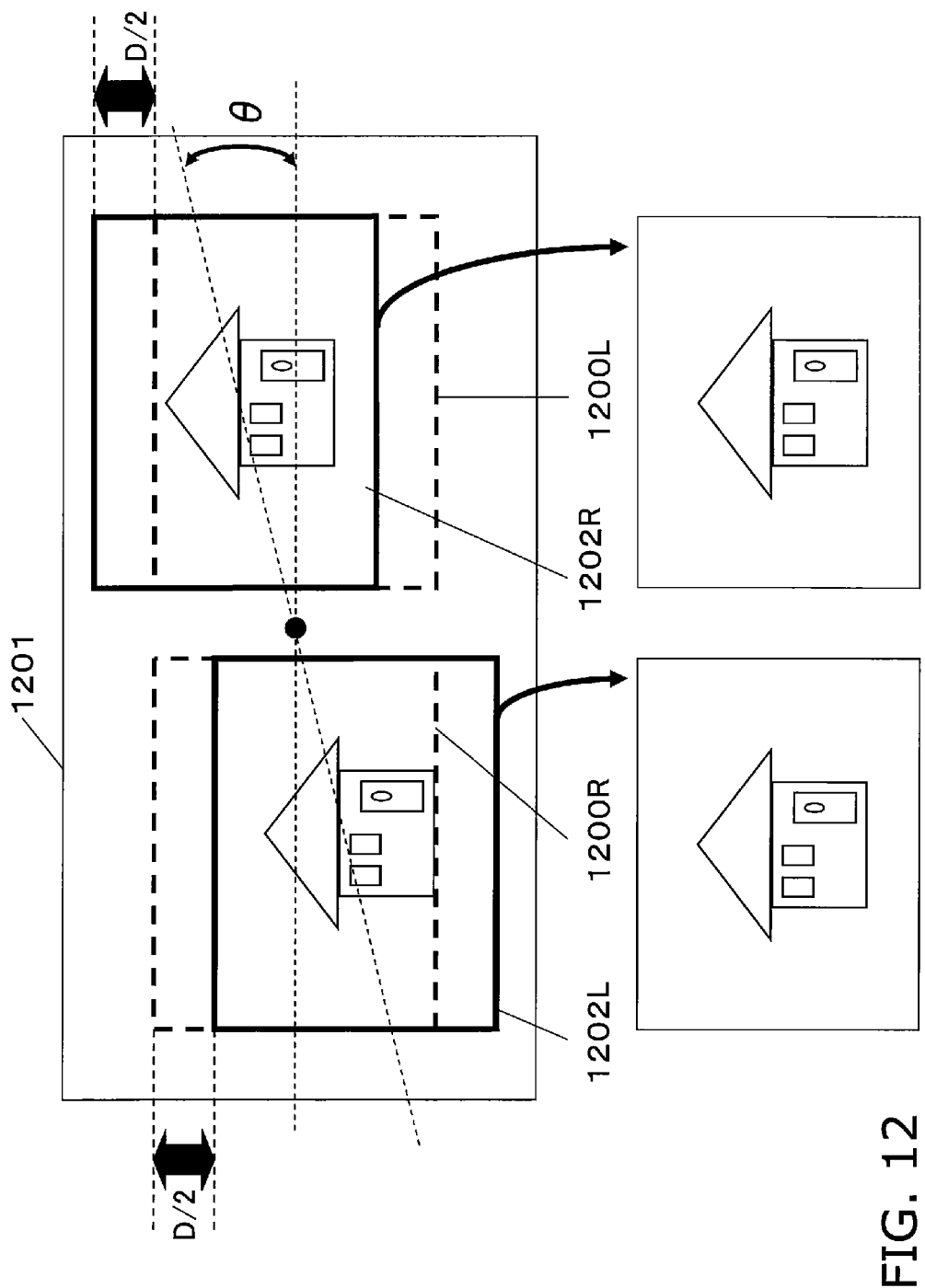
FIG. 12 is an example of the captured left and right images and the image on the imaging element 300 according to a second embodiment.

When the imaging device is rotated in the roll direction as shown in FIG. 6, if the image blur correcting mechanism 311 is actuated, the image on the imaging plane will be as shown in FIG. 8, as already described above. The system controller 308 at this point computes the amount of positional offset D in the vertical direction between two (left and right) images from the correction angle (rotational angle θ) of movement in the roll direction, on the basis of Mathematical Formula 1. The read region of the image signal from the imaging element 300 is shifted in the direction of eliminating the positional offset D between the left and right images. This will be described through reference to FIG. 12. In FIG. 12, read regions 1200R and 1200L are indicated by broken lines, and read regions 1202R and 1202L are indicated by solid lines. The read regions 1200R and 1200L are the regions that are read when the image read region from the imaging element 300 is not shifted. The read regions 1202R and 1202L are the regions that are read when the image read region from the imaging element 300 is shifted. As shown in FIG. 12, the read regions 1200R and 1200L are shifted in opposite directions, each by one-half the offset amount D of the left and right images, and if the images of the read regions 1202R and 1202L are read, positional offset can be eliminated in the vertical direction between two images.

3. Actions and Effects

As discussed above, with the imaging device pertaining to the second embodiment, even if movement correction in the roll direction is performed during the capture of a 3D image, the positional offset in the vertical direction between two (left and right) parallax images caused by movement correction in the roll direction can be suppressed by changing the read locations of the two captured images. Thus, an imaging device can be provided with which a 3D image that reduces discomfort on the part of an observer can be captured.

4. Modification Examples of Second Embodiment (1) In the second embodiment, a constitution was described in which the read locations of two images from the imaging element 300 were shifted, but this is not the only option. For example, the entire region of the image indicated by 1201 in FIG. 12 may be temporarily stored in the memory 304, and the read location from this entire recorded image is shifted so that only part of the image is read. The same effect will be obtained in this case.

(2) Also, the imaging element 300 above was a CMOS type of imaging element, and the desired region of the image was read by X-Y address method, but the imaging element may instead be a CCD, the high-speed transfer mode of the CCD may be used to read just the required portion of the image in the vertical direction, and this may be recorded to the memory 304, after which image cropping is performed in two stages of again reading from the memory 304 just the required portion.

Other Embodiments

The present invention was described above by giving embodiments, but the text and drawings that make up part of this disclosure should not be interpreted as limiting this invention. Various alternative embodiments, working examples, and applications should be clear to a person skilled in the art from this disclosure.

Figure 13:
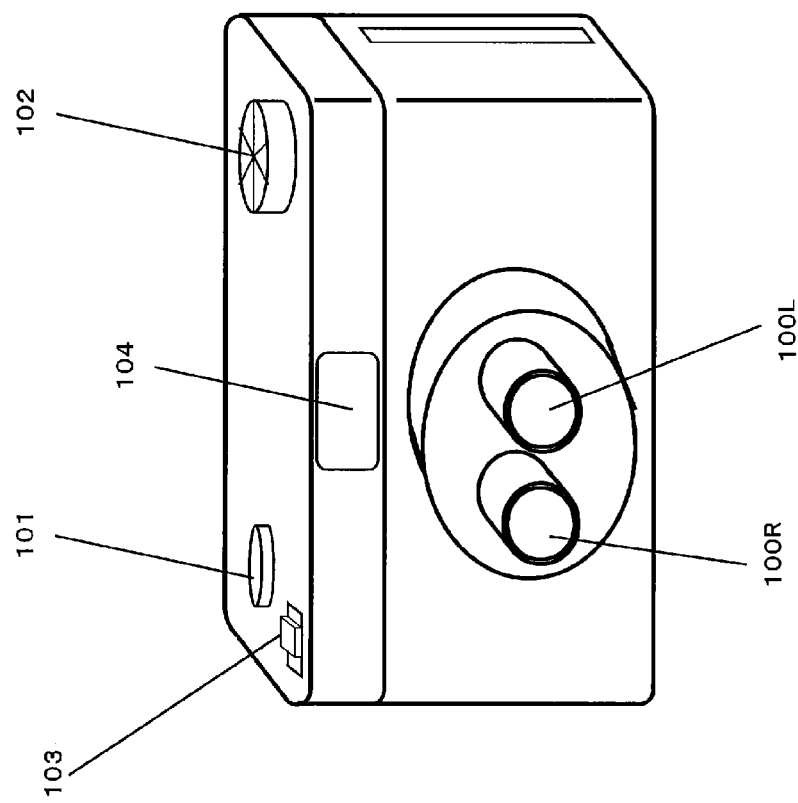
FIG. 13 is a view of a camera with an integrated lens.

(A) The imaging device was described as an interchangeable lens type of camera, but this is not the only option. The present invention is also effective when a camera body and a plurality of imaging lenses intended for 3D imaging are integrated as shown in FIG. 13. In this case, when the user sets the device to 2D imaging mode, movement correction in the roll direction may be permitted, and when 3D imaging mode is set, movement correction in the roll direction may be forbidden.

(B) Also, a constitution was described in which a gyro sensor (angular velocity sensor) was used to detect movement of the imaging device, but this is not the only option. For example, an acceleration sensor, an inclination (tilt) sensor, or another such sensor can be used instead. Furthermore, rather than the above-mentioned gyro sensor or other such physical sensor, movement of the imaging device caused by hand shake may be detected using a movement vector detected from a captured image, and the present invention will be effective when movement of the imaging device is found from a movement vector. Incidentally, the technique for detecting the movement vector from an image may be the method discussed in Japanese Patent No. 2,516,580, for example, but the method is not limited to any particular one.

(C) Also, a constitution was described in which an imaging device for obtaining a 3D image had two imaging lenses, but this is not the only option. The present invention will be effective with a constitution having three or more imaging lenses.

(D) In the above description a distinction was made between still and moving picture images, but the present invention is effective whether the image is a still picture or a moving picture.

(E) Also, the 3D moving picture was described as a time division type of 3D moving picture, but this is not the only option, and the present invention will also be effective wither any other commonly known type of 3D moving picture.

(F) The recording of audio was not particularly described, but a constitution in which audio is recorded in synchronization with a moving picture is, of course, also possible.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the imaging device. Accordingly, these terms, as utilized to describe the present invention should be interpreted relative to a vehicle equipped with the imaging device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device comprising:
a lens mount configured to support a lens unit having an optical axis, a first optical system, and a second optical system;
an imaging element configured to receive and convert an optical image formed by the lens unit into an image signal, the first optical system being configured to form a first optical image from a first perspective on the imaging element, and the second optical system being configured to form a second optical image from a second perspective on the imaging element;
a system controller connected to the imaging element and configured to process the image signal;
a sensor connected to the system controller and configured to detect movement of the imaging device; and
a rotation corrector connected to the system controller, the rotation corrector being configured to reduce change in the positional relationship between the optical image and the imaging element caused by movement of the imaging device around an axis parallel to the optical axis of the lens unit,
the system controller being configured to halt operation of the rotation corrector when the lens unit is supported by the lens mount.

2. An imaging device comprising:

a lens mount configured to support a lens unit having an optical axis, a first optical system, and a second optical system;

an imaging element configured to receive and convert an optical image formed by the lens unit into an image signal, the first optical system being configured to form a first optical image from a first perspective on the imaging element, and the second optical system being configured to form a second optical image from a second perspective on the imaging element;

a system controller connected to the imaging element and configured to process the image signal;

a sensor connected to the system controller and configured to detect movement of the imaging device;

a rotation corrector connected to the system controller, the rotation corrector being configured to reduce change in the positional relationship between the optical image and the imaging element caused by movement of the imaging device around an axis parallel to the optical axis of the lens unit; and an image cropper connected to the imaging element and configured to selectively read part of the image signal based on movement of the imaging device around the axis parallel to the optical axis of the lens unit, the system controller being configured to bring the image cropper and the rotation corrector into operation when the lens unit is supported by the lens mount.

3. An imaging device comprising:

a 3D optical system including an optical axis, a first optical system, and a second optical system;

an imaging element coupled to the 3D optical system and configured to receive and convert an optical image formed by the 3D optical system into an image signal, the first optical system being configured to form a first optical image from a first perspective on the imaging element, and the second optical system being configured to form a second optical image from a second perspective on the imaging element;

a system controller connected to the imaging element and configured to process the image signal;

a sensor connected to the system controller and configured to detect movement of the imaging device; and a rotation corrector connected to the system controller, the rotation corrector being configured to reduce change in the positional relationship between the optical image and the imaging element caused by movement of the imaging device around an axis parallel to the optical axis of the 3D optical system, the system controller being configured to halt operation of the rotation corrector in 3D imaging mode of the imaging device.

4. An imaging device comprising:

a 3D optical system having an optical axis, a first optical system, and a second optical system;

an imaging element coupled to the 3D optical system and configured to receive and convert an optical image formed by the 3D optical system into an image signal, the first optical system being configured to form a first optical image from a first perspective on the imaging element, and the second optical system being configured to form a second optical image from a second perspective on the imaging element;

a system controller connected to the imaging element and configured to process the image signal;

a sensor connected to the system controller and configured to detect movement of the imaging device;

a rotation corrector connected to the system controller, the rotation corrector being configured to reduce change in the positional relationship between the optical image and the imaging element caused by movement of the imaging device around an axis parallel to the optical axis of the 3D optical system; and an image cropper connected to the imaging element and configured to selectively read part of the image signal based on movement of the imaging device around the axis parallel to the optical axis of the 3D optical system, the system controller being configured to bring the image cropper and the rotation corrector into operation during 3D imaging mode of the imaging device.

5. The imaging device according to claim 1, wherein the rotation corrector has a rotation driver that rotates the imaging element.

6. The imaging device according to claim 1, wherein the rotation corrector has a rotation processor that rotates and reads part of the image signal.

7. The imaging device according to claim 1, wherein the sensor is either a slope sensor, an acceleration sensor, or an angular velocity sensor.

8. The imaging device according to claim 1, wherein the sensor is configured to detect a movement vector from the optical image captured by the lens unit.

9. The imaging device according to claim 1, further comprising:

a warning component configured to provide the user with audio or video, wherein the system controller is configured to command the warning component to notify the user that the operation of the rotation corrector has stopped during 3D imaging mode.

10. An imaging device comprising:

a lens mount configured to support a first lens unit having two optical systems and a pair of optical axes and a second lens unit having one optical system and one optical axis;

an imaging element configured to receive and convert an optical image formed by the first or second lens unit into an image signal;

a sensor configured to detect movement of the imaging device;

a rotation corrector configured to rotate the imaging element around an axis parallel to the optical axes of the first lens unit or the optical axis of the second lens unit; and a system controller connected to the sensor and configured to actuate the rotation corrector based on movement of the imaging device around the axis parallel to the optical axes of the first lens unit or the optical axis of the second lens unit when the second lens unit is supported by the lens mount, the system controller being further configured to suspend operation of the rotation corrector when the first lens unit is supported by the lens mount.

11. An imaging device comprising:

a lens mount configured to support a first lens unit having two optical systems and a pair of optical axes and a second lens unit having one optical system and one optical axis;

an imaging element configured to receive and convert an optical image formed by the first or second lens unit into an image signal, the imaging element being configured to have two reading regions;

a sensor configured to detect movement of the imaging device;

a rotation corrector configured to rotate the imaging element around an axis parallel to the optical axes of the first lens unit or the optical axis of the second lens unit; and a system controller connected to the sensor and configured to actuate the rotation corrector based on movement of the imaging device around the axis parallel to the optical axes of the first lens unit or the optical axis of the second lens unit, the system controller being further configured to move the vertical position of the two reading regions closer together on the imaging element when the first lens unit is supported by the lens mount.

12. The imaging device according to claim 2, wherein the rotation corrector has a rotation driver that rotates the imaging element.

13. The imaging device according to claim 2, wherein the sensor is either a slope sensor, an acceleration sensor, or an angular velocity sensor.

14. The imaging device according to claim 2, wherein the sensor is configured to detect a movement vector from the optical image captured by the lens unit.

15. The imaging device according to claim 3, wherein the rotation corrector has a rotation driver that rotates the imaging element.

16. The imaging device according to claim 3 wherein the sensor is either a slope sensor, an acceleration sensor, or an angular velocity sensor.

17. The imaging device according to claim 3, wherein the sensor is configured to detect a movement vector from the optical image captured by the 3D optical system.

18. The imaging device according to claim 3, further comprising:
a warning component configured to provide the user with audio or video, wherein
the system controller is configured to command the warning component to notify the user that the operation of the rotation corrector has stopped during the 3D imaging mode of the imaging device.

19. The imaging device according to claim 4, wherein the rotation corrector has a rotation driver that rotates the imaging element.

20. The imaging device according to claim 4, wherein the sensor is either a slope sensor, an acceleration sensor, or an angular velocity sensor.

21. The imaging device according to claim 4, wherein the sensor is configured to detect a movement vector from the optical image captured by the 3D optical system.

* * * * *